(12) United States Patent
Beye

(10) Patent No.: US 11,507,490 B2
(45) Date of Patent: Nov. 22, 2022

(54) THROUGHPUT ESTIMATION DEVICE AND THROUGHPUT ESTIMATION SYSTEM

(71) Applicant: NEC Corporation, Tokyo (JP)

(72) Inventor: Florian Beye, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 16/761,055

(22) PCT Filed: Nov. 10, 2017

(86) PCT No.: PCT/JP2017/040612
§ 371 (c)(1),
(2) Date: May 1, 2020

(87) PCT Pub. No.: WO2019/092853
PCT Pub. Date: May 16, 2019

(65) Prior Publication Data
US 2020/0285556 A1    Sep. 10, 2020

(51) Int. Cl.
*G06F 11/34* (2006.01)
*G06F 11/30* (2006.01)
*G06F 11/32* (2006.01)

(52) U.S. Cl.
CPC ...... *G06F 11/3452* (2013.01); *G06F 11/3051* (2013.01); *G06F 11/321* (2013.01); *G06F 11/3414* (2013.01); *G06F 11/3447* (2013.01); *G06F 2201/865* (2013.01)

(58) Field of Classification Search
CPC ............. G06F 11/3006; G06F 11/3051; G06F 11/321; G06F 11/3414; G06F 11/3447; G06F 11/3452; G06F 2201/865

USPC ........................................................ 702/182
See application file for complete search history.

(56) References Cited

U.S. PATENT DOCUMENTS

| | | | |
|---|---|---|---|
| 7,058,560 B1 | 6/2006 | Arakawa et al. | |
| 8,719,774 B2 * | 5/2014 | Wang | G06F 8/20 717/109 |
| 2003/0139918 A1 | 7/2003 | Hardwick et al. | |

FOREIGN PATENT DOCUMENTS

| | | |
|---|---|---|
| JP | 2000-172537 A | 6/2000 |
| JP | 2002-099448 A | 4/2002 |
| JP | 2014-132419 A | 7/2014 |
| JP | 2015-141552 A | 8/2015 |

OTHER PUBLICATIONS

Japanese Office Action for JP Application No. 2020-520080 dated May 18, 2021 with English Translation.

(Continued)

*Primary Examiner* — John H Le
(74) *Attorney, Agent, or Firm* — Sughrue Mion, PLLC

(57) ABSTRACT

The throughput estimation device 10 comprises a storage 11 which stores tuples, each including an evaluation formula and parameter data, and a calculation device constructing unit 12 which constructs a calculation device according to a configuration including data associated with software processes, data associated with hardware resources, data associated with interconnections between a software process and a hardware resource, and the tuples, wherein the calculation device inputs a load vector describing input information load to the software processes, and outputs a result value.

9 Claims, 14 Drawing Sheets

(56) References Cited

OTHER PUBLICATIONS

L. Cao et al., "NFV-VITAL: A Framework for Characterizing the Performance of Virtual Network Functions", p. 93-99, in Proceedings of IEEE Conference on Network Function Virtualization and Software Defined Networks, 2015, San Francisco, CA, USA, Nov. 18-21, 2015.
International Search Report for PCT Application No. PCT/JP2017/040612, dated Jan. 30, 2018.
Written opinion for PCT Application No. PCT/JP2017/040612, dated Jan. 30, 2018.

* cited by examiner

THROUGHPUT ESTIMATION DEVICE AND THROUGHPUT ESTIMATION SYSTEM

This application is a National Stage Entry of PCT/JP2017/040612 filed on Nov. 10, 2017, the contents of all of which are incorporated herein by reference, in their entirety.

TECHNICAL FIELD

The present invention relates to a throughput estimation device for estimating throughput of an information processing device.

BACKGROUND ART

In many situations, it is desirable to understand how much information per time unit can be processed by an information processing device without a degradation in information processing quality. Such an understanding can usually be obtained by a performance evaluating measurement on the information processing device.

However, matters are complicated when information processing is implemented in software running on general purpose computing hardware, and when further (1) general purpose computing hardware of different specifications is considered, and when (2) concurrent execution of a multitude of information processing software on a shared general purpose computing hardware is considered.

Non-Patent Literature 1 (NPL 1) discloses a method for improving VNF (Virtual Network Function) performance in the context of network function virtualization (NFV). VNF is a network function implemented by software, i.e. a virtual machine. In NFV, network equipment is divided into one or more pieces of software and one or more pieces of hardware, and a network function is provided on a virtual infrastructure consisting of general purpose servers.

General arts such as techniques described in NPL1 require a separate performance evaluating measurement for each combination of executing software and underlying hardware. This results in the number of combinations and hence the number of performance evaluating measurements to quickly become large when increasing the number of types of hardware and software to be considered, rendering the approach of general arts such as techniques described in NPL 1 impractical in many common situations.

CITATION LIST

Non Patent Literature

NPL 1: L. Cao et al., "NFV-VITAL: A Framework for Characterizing the Performance of Virtual Network Functions", in Proceedings of IEEE Conference on Network Function Virtualization and Software Defined Networks, 2015, San Francisco, Calif., USA, Nov. 18-21, 2015

SUMMARY OF INVENTION

Technical Problem

In the case when a multitude of information processing functionalities implemented in software is executed concurrently on top of a given general purpose computer, it is a difficult problem to estimate the potential information processing throughput of each single information processing functionality due to performance degradation from sharing of computer-internal resources such as bus bandwidth or CPU (Central Processing Unit) cache. This is because in general a separate performance evaluation for each possible combination of information processing functionalities executed on top of the given underlying general purpose computer must be performed.

Further, in the case when a given information processing functionality implemented in software is executed on top of a general purpose computer, it is a difficult problem to estimate the potential information processing throughput when different kinds of underlying general purpose computers having different specifications are considered. This is because in general a separate performance evaluation of the given information processing functionality must be performed for each kind of underlying general purpose computer.

In view of the above problems, an exemplary object of the present invention is to provide a throughput estimation device based on a feed-forward network of calculation units. Calculation units include separate units for modeling the behavior of software processes and hardware resources.

Solution to Problem

A throughput estimation device according to the present invention includes storing means for storing tuples, each including an evaluation formula and parameter data; and calculation device constructing means for constructing a calculation device according to a configuration including data associated with software processes, data associated with hardware resources, data associated with interconnections between a software process and a hardware resource, and the tuples, wherein the calculation device inputs a load vector describing input information load to the software processes, and outputs a result value.

A throughput estimation system according to the present invention includes the throughput estimation device, optimization means for minimizing an objective function; and objective function evaluation means for inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result to the optimization means.

A throughput estimation method according to the present invention includes constructing a throughput estimation device including a calculation device according to a configuration including data associated with software processes, data associated with hardware resources, data associated with interconnections between a software process and a hardware resource, and the tuples, each including an evaluation formula and parameter data, wherein the calculation device is so constructed that it outputs a result value responsive to inputted a load vector describing input information load to the software processes.

A throughput estimation program according to the present invention causes a computer to execute: a process of constructing a throughput estimation device including a calculation device according to a configuration including data associated with software processes, data associated with hardware resources, data associated with interconnections between a software process and a hardware resource, and the tuples, each including an evaluation formula and parameter data, wherein the calculation device is so constructed that it outputs a result value responsive to inputted a load vector describing input information load to the software processes.

Advantageous Effects of Invention

This invention allows to estimate the degradation of throughput of a multitude of information processing functionalities implemented in software from sharing of computer-internal resources, as well as throughput of an information processing functionality implemented in software when executed on top of different kinds of underlying general purpose computer hardware, while reducing the total number of required performance evaluations.

DESCRIPTION OF EMBODIMENT

Figure 1:
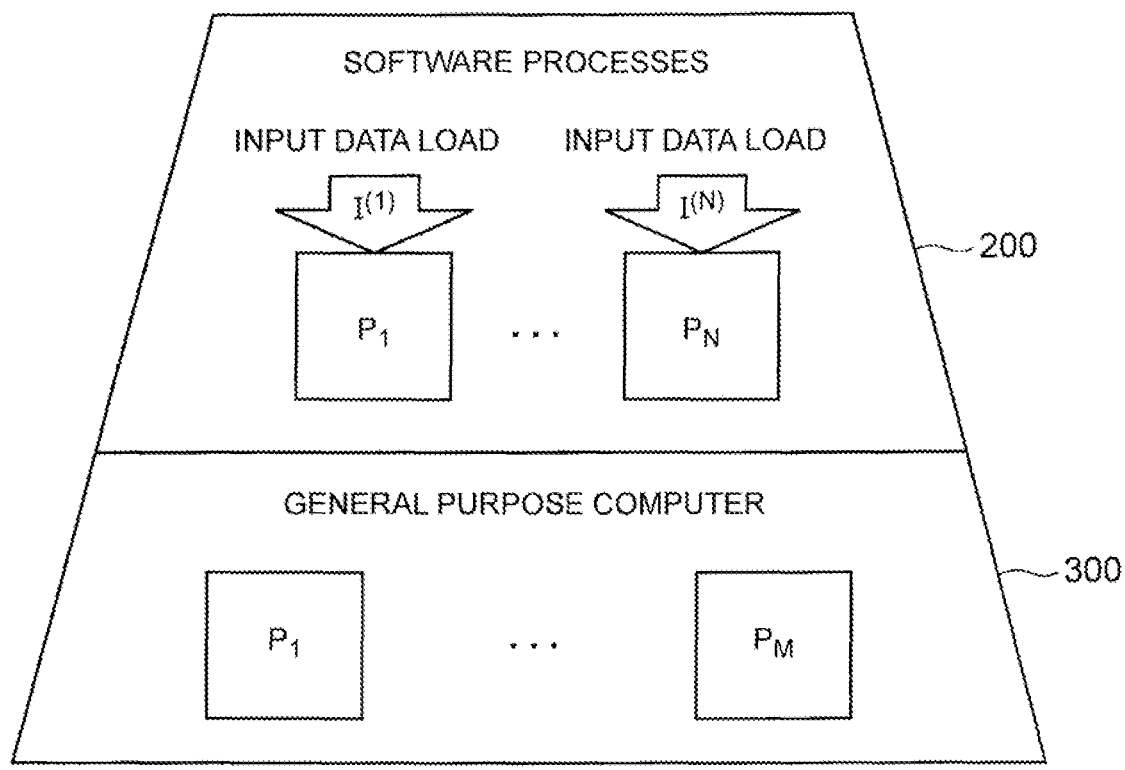
FIG. 1
It is an explanatory diagram for explaining information-processing software processes executed on top of a general purpose computer.

At first, a feed-forward network including calculation units will be explained. The feed-forward network is suitably applicable to a throughput estimation device. FIG. 1 shows information-processing software processes executed on top of a general purpose computer. Note a personal computer and a server are included in a general purpose computer.

Consider a system consisting of a multitude of software processes $(P_1, \ldots, P_N)$ 200 executed concurrently on top of a general purpose computer 300 containing hardware resources $(R_1, \ldots, R_M)$, as shown in FIG. 1. Each software process processes information (e.g. bytes, network packets, interrupts, etc.) arriving from outside the computer or being generated inside the computer.

The amount of information per time unit (e.g., packets per second) to be processed by the k-th process $P_k$ is represented by a load vector $I^{(k)}$, where the vector component $I_a(k)$ denotes the amount of information of a specific type a to be processed per time unit by the k-th process.

A throughput estimation device described below can be used to estimate whether a system load can be processed by a system, while maintaining sufficient information processing quality.

The estimation is performed by means of a feed-forward network of calculation units. The feed-forward network takes as input an external load vector I, and outputs a probability value y, where y is in the range of 0-1. The probability value y suggests the probability that the system is capable of processing the load given by load vector I while maintaining sufficient information processing quality (for example, low-enough information loss and low-enough processing delay).

The feed-forward network contains one layer or several layers of calculation units representing the software processes $(P_1, \ldots, P_N)$ 200, one layer of calculation units representing hardware resources $(R_1, \ldots, R_M)$ 300, as well as a fixed function calculation unit which gathers the outputs of all units representing the hardware resources and computes the final output of the feed-forward network. For each software process $P_k$ the feed-forward network contains exactly one calculation unit. For each hardware resource $R_n$ the feed-forward network contains exactly one calculation unit.

Figure 2:
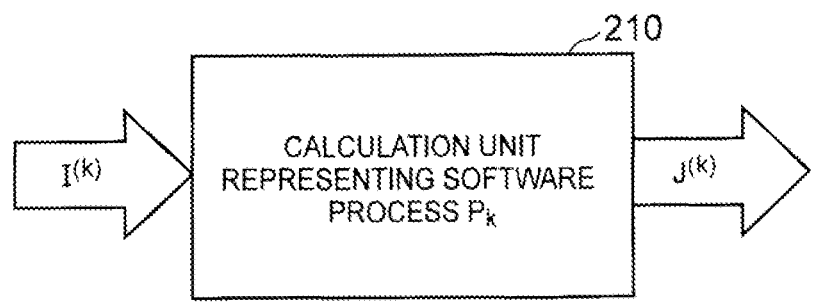
FIG. 2
It is a block diagram showing an example of a calculation unit representing a software process.

FIG. 2 shows an example of a calculation unit 210 representing a software process. The calculation unit representing a software process $P_k$ takes as input the load vector $I^{(k)}$ which is constructed by concatenation from vector components of the external load vector I and/or vector components of vectors output by other calculation units representing a software process. The term "and/or" means at least one of them. The calculation unit representing a software process $P_k$ outputs a vector $J^{(k)}$ whose vector components can be fed into the inputs of other calculation units representing a software process and/or other units representing hardware resources. The output $J^{(k)}$ of a calculation unit representing a software process $P_k$ is generated by a transformation of the input (load vector) $I^{(k)}$ which depends on the type of software process.

Figure 3:
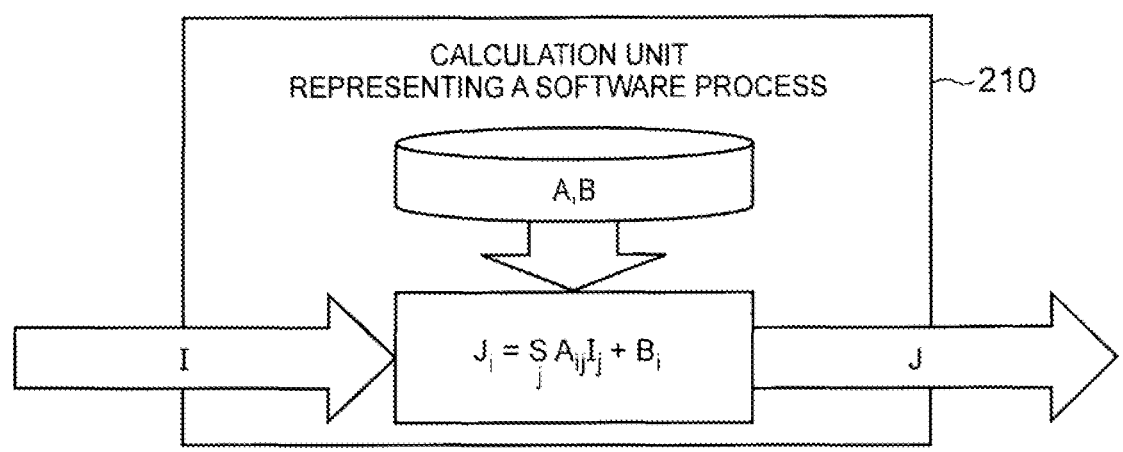
FIG. 3
It is a block diagram for explaining a possible realization of a calculation unit representing a software process with load transformation model based on affine transformation.

FIG. 3 shows a possible realization of a calculation unit representing a software process 210. The realization uses a load transformation based on an affine transformation, determining the output vector J from the input vector I as $J_i=S_j(A_{ij}I_j+B_i)$. Note $S_j$ means the sum total for j. In general, S is expressed by a capital "sigma" of Greek character. The matrix A and the vector B are model parameters specific to the type of software process.

Figure 4:
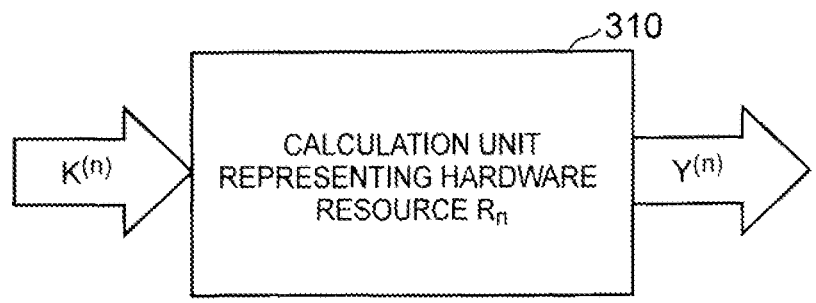
FIG. 4
It is a block diagram showing an example of a calculation unit representing a hardware resource.

FIG. 4 shows an example of a calculation unit 310 representing a hardware resource. The calculation unit representing a hardware resource $R_n$ takes as input a load vector $K^{(n)}$ which is constructed by concatenating vector components of the vectors $J^{(k)}$, and outputs a probability value $Y^{(n)}$, where $Y^{(n)}$ is in the range of 0-1. The probability value $Y^{(n)}$ suggests the probability that the load corresponding to the load vector $K^{(n)}$ can be handled by the hardware resource without exceeding its capacity. The probability value $Y^{(n)}$ outputted from a calculation unit 310 representing a hardware resource $R_n$ is generated depending on the input load vector $K^{(n)}$ and depending on the type of hardware resource.

As described below, the feed-forward network having calculation units includes calculation units representing software processes, calculation units representing hardware resources, and a calculation unit carrying out a logical AND operation.

In a final layer, a fixed function calculation unit (logical AND calculation unit) gathers the outputted probability values $Y^{(n)}$ of all calculation units representing the hardware resources $R_n$ and computes the final output y of the feed-forward network as $y=P^M_{n=1}Y^{(n)}$, which is to be interpreted as logical AND operation. Note $P^M_{n=1}$ means the product total. In this case, it means the product total of Y(1) to Y(M).

Figure 5:
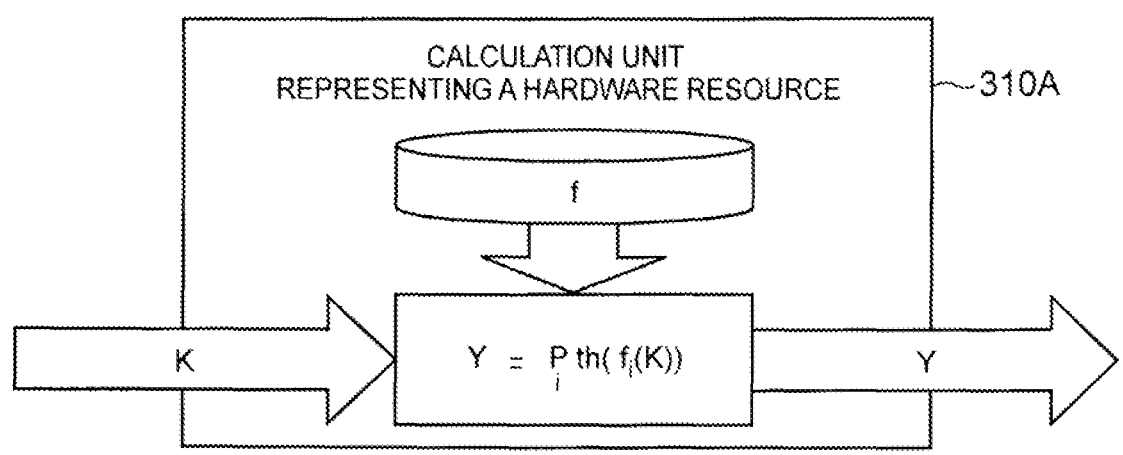
FIG. 5
It is a block diagram for explaining a possible realization of a calculation unit representing a hardware resource.

FIG. 5 shows a possible realization of a calculation unit 310 (shown as 310A in FIG. 5) representing a hardware resource. The realization is based on an arbitrary vector transformation f and the step function th (in general, expressed by "theta" of Greek character), determining the output value Y from the input vector K as $Y=P_i th(f_i(K))$. Note P means a product of elements. Thus, $P_i$ means a product for all i. $P_{a=1}^L$ means a product of L elements. In general, P is expressed by a capital "pi" of Greek character. The vector transformation f can be chosen depending on the type of hardware resource. The step function th(x) outputs "0" if x<0 and "1" otherwise.

Instead of the step function th, a sigmoid function $s(x)=1/(1+e^{-kx})$ may be used. In general, s of s(x) is expressed by a capital "sigma". In this realization the output value Y is determined from the input vector K as $Y=P_i s(f_i(K))$ instead of the above $Y=P_i th(f_i(K))$. Even in this case, the vector transformation f can be chosen depending on the type of hardware resource.

Figure 6:
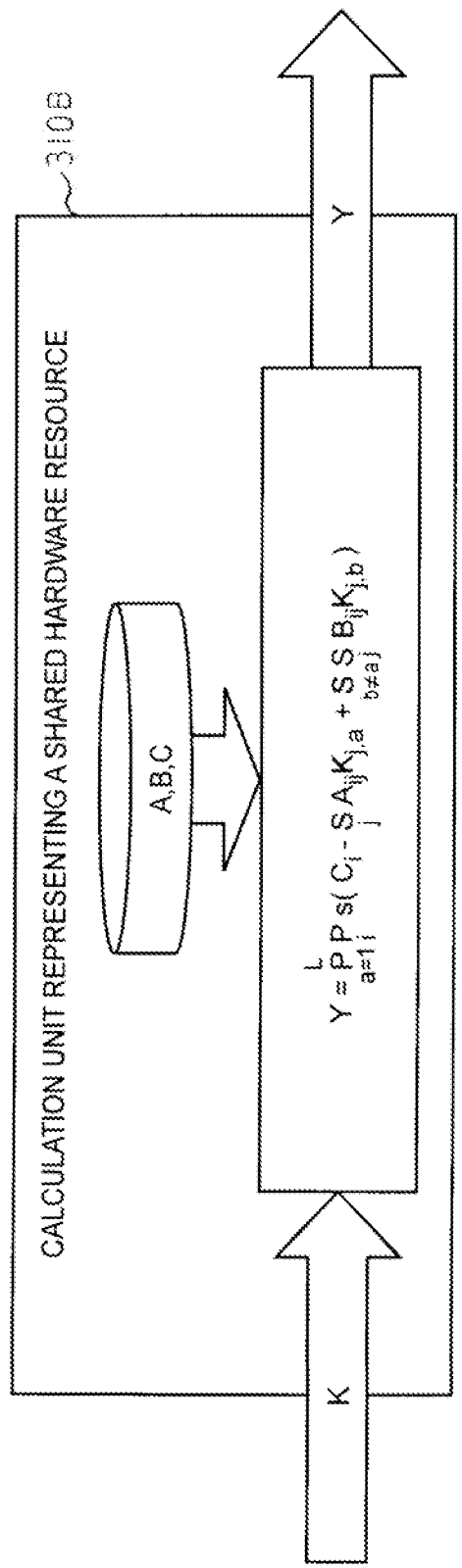
FIG. 6
It is a block diagram for explaining another possible realization of a calculation unit representing a hardware resource.

FIG. 6 shows another possible realization of a calculation unit 310 (shown as 310B in FIG. 6) representing a hardware resource. This realization corresponds to specializing realization shown in FIG. 5, where it is assumed that the hardware resources are shared by a number L of consumers. The realization is based on an affine transformation and the sigmoid function s, determining the output value Y from the input vector K as $Y=P_{a=1}^L P_i s(C_i-S_j A_{ij}K_{j,a}+S_{b\,not\,equal\,to\,a} S_j B_{ij}K_{j,b})$.

Here, the input vector K is rewritten as a rank-2 matrix. The matrices A and B as well as the vector C are model parameters specific to the type of hardware resource. $[S_{b\,not\,equal\,to\,a}]$ means the sum total for all b different from a.

It should be noted that the term "software process" as used in this specification may denote, for example, an operating system process. It could also denote any other meaningful executing entity of information processing software, such as a group of operating system threads or a group of operating system processes.

Further, it should be noted that an input vector component of a calculation unit can only be fed from a single vector component at the same time.

Furthermore, it should be noted that a feed-forward network of calculation units can be realized by software executing on a general purpose computer hardware consisting of at least memory, CPU and I/O (Input/Output) unit.

Example a of the Feed-Forward Network

Figure 7:
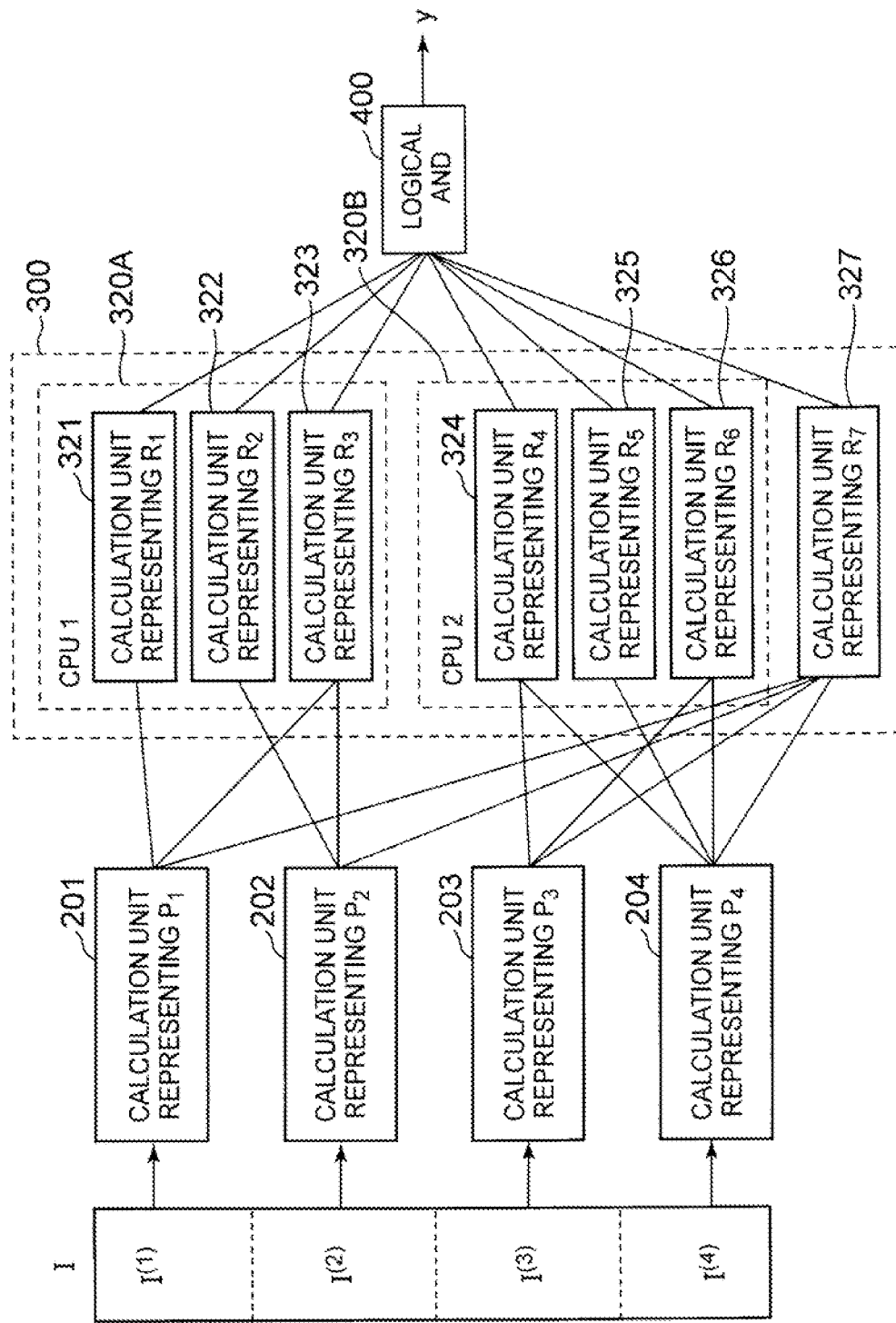
FIG. 7
It is a block diagram showing an example of a feed-forward network with one software process layer.

FIG. 7 shows an example of a feed-forward network with one software process layer. This example contains four software processes ($P_1, \ldots, P_4$) 201-204 and seven hardware resources ($R_1, \ldots, R_7$) 321-324. The hardware resources shall model a general purpose computer 300 containing two CPUs 320A,320B with two cores each.

Hardware resources $R_1$ and $R_2$ shall model the capacities of the CPU cores of the first CPU 320A, and $R_4$ and $R_5$ shall model the capacities of the CPU cores of the second CPU 320B. Hardware resources $R_3$ and $R_6$ shall model the capacities of the CPU-wide shared resources such as level 3 cache of each respective CPU. Hardware resource $R_7$ shall model the capacities of computer-wide shared resources such as memory bandwidth or I/O bandwidth.

Software process $P_1$ is assumed to be pinned to the first core of the first CPU 320A, software process $P_2$ is assumed to be pinned to the second core of the first CPU 320A, software process $P_3$ is assumed to be pinned to the first core of the second CPU 320B and software process $P_4$ is assumed to be pinned to both cores of the second CPU 320B.

The lines between the calculation units representing software processes and the calculation units representing hardware resources indicate which vectors $J^{(k)}$ provide vector components for a given $K^{(n)}$. A specific ordering or choice of vector components is not specified in this example.

Example B of the Feed-Forward Network

Figure 8:
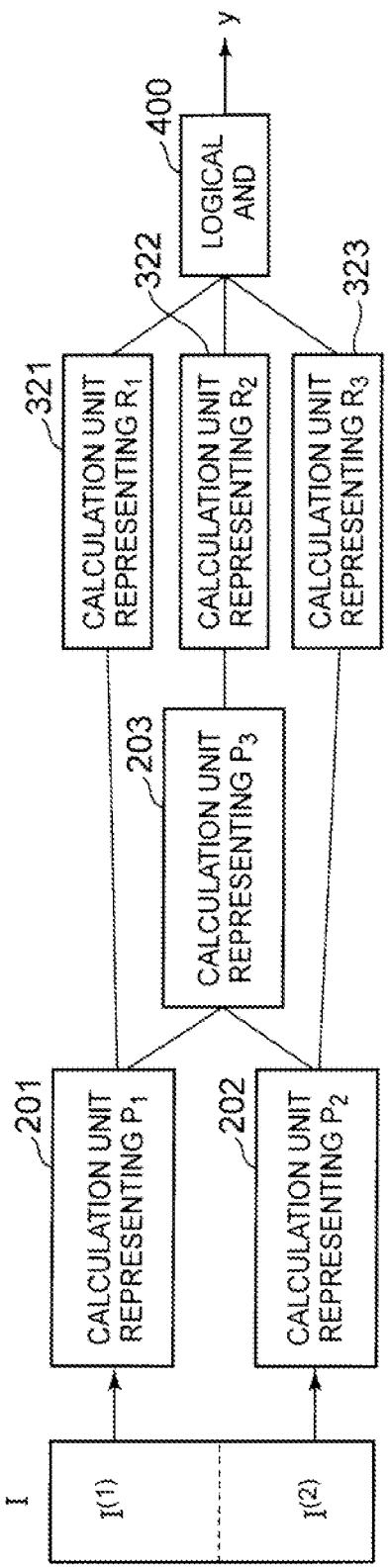
FIG. 8
It is a block diagram showing another example of a feed-forward network with two software process layers.

FIG. 8 shows another example of a feed-forward network with two software process layers. This example contains three software processes ($P_1, P_2, P_3$) 201,202,203 and three hardware resources ($R_1, R_2, R_3$) 321, 322, 323. The feed-forward network in this example contains a first layer of calculation units representing two software processes $P_1$, and $P_2$, a second layer consisting of a calculation unit representing software process $P_3$, as well as a layer consisting of three hardware resources ($R_1, R_2, R_3$). In this example the input load $I^{(3)}$ of the software process $P_3$ is determined by concatenating vector components of the output vectors $I^{(1)}$ and $I^{(2)}$ of the calculation units representing software processes $P_1$ and $P_2$, respectively. A specific ordering or choice of vector components is not specified in this example.

Exemplary Embodiment 1

Figure 9:
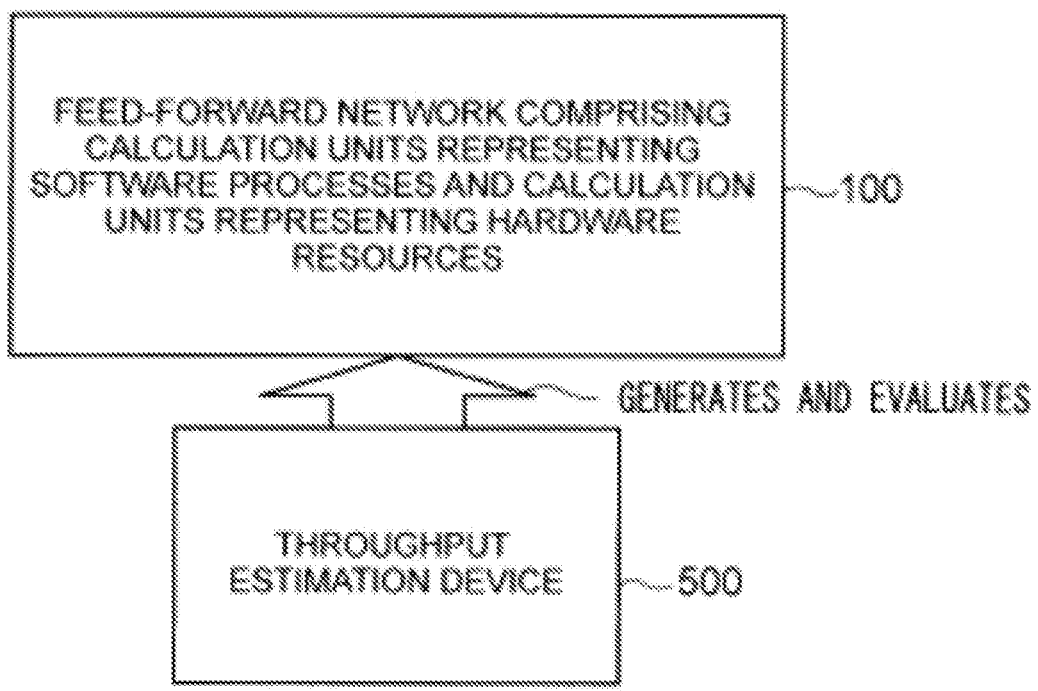
FIG. 9
It is a block diagram showing a relationship between a throughput estimation device and a feed-forward network of calculation units.

FIG. 9 shows a relationship between a throughput estimation device and a feed-forward network of calculation units. The throughput estimation device 500 generates and evaluates a feed-forward network 100. The feed-forward network 100 is constructed as shown in FIG. 7 for example. Thus, the feed-forward network 100 includes calculation units representing software processes and calculation units representing hardware resources.

Figure 10:
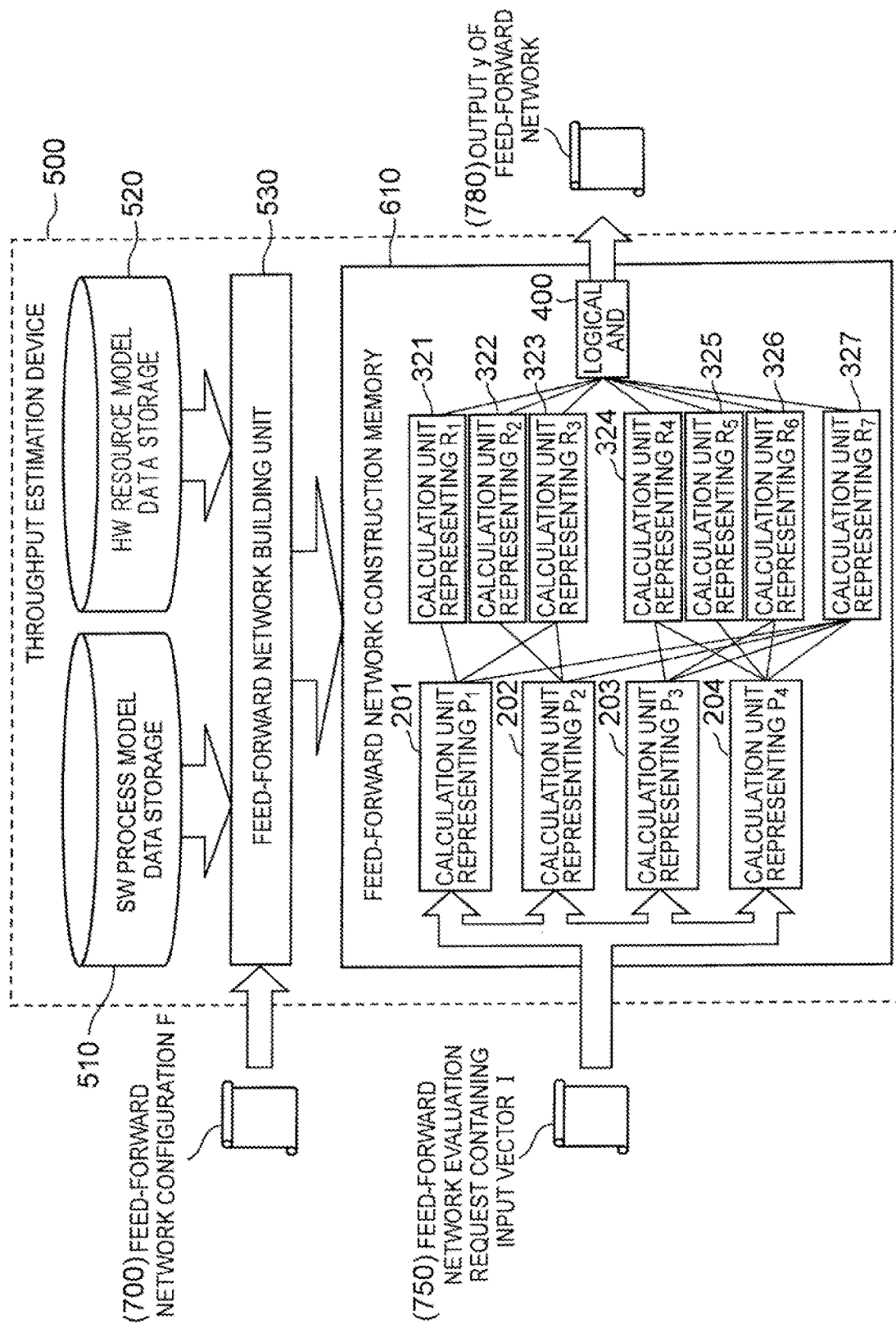
FIG. 10
It is a block diagram showing an exemplary embodiment of the throughput estimation device.

FIG. 10 is a block diagram showing an exemplary embodiment of the throughput estimation device 500.

The throughput estimation device 500 includes a software process model data storage 510, a hardware resource model data storage 520, a feed-forward network building unit 530, and a feed-forward network construction memory 610. Hereinafter, an area, where a feed-forward network construction is constituted in the feed-forward network construction memory 610, is referred to as a feed-forward network construction canvas.

In the feed-forward network construction canvas, calculation units such as 201-204, 321-327 can be placed and interconnected. In FIG. 10, the canvas has been filled, for exemplary purpose, with the feed-forward network shown in FIG. 7.

The software process model data storage 510 stores a software process model data catalog. This catalog includes a list corresponding to respective prototype calculation units representing software processes. Each list entry corresponds to a type of software process. A prototype calculation unit is stored by storing the following:
(1) an evaluation formula for calculating the output vector of a calculation unit representing a software process from an input vector, model parameter data, and instantiation parameter data, and
(2) model parameter data to be used as constants in the evaluation.

For example, an evaluation formula could be the one given as shown in FIG. 3, and model parameter data could be specific values for matrix A and the vector B as shown in FIG. 3.

The hardware resource model data storage 520 stores a hardware resource model data catalog. This catalog includes a list corresponding to respective prototype calculation units representing hardware resources. Each list entry corresponds to a type of hardware resource. A prototype calculation unit is stored by storing the following:
(1) an evaluation formula for calculating the output of a calculation unit representing a hardware resource from an input vector, model parameter data, and instantiation parameter data, and
(2) model parameter data to be used as constants in the evaluation.

For example, an evaluation formula could be the one given as shown in FIG. 8, and model parameter data could be specific values for matrices A and B, and the vector C as shown in FIG. 8, whereas the variable L shown in FIG. 8 would be an instantiation parameter.

The feed-forward network building unit 610 inputs a feed-forward network configuration F (the feed-forward network configuration 700), and outputs a feed-forward network.

Figure 11:
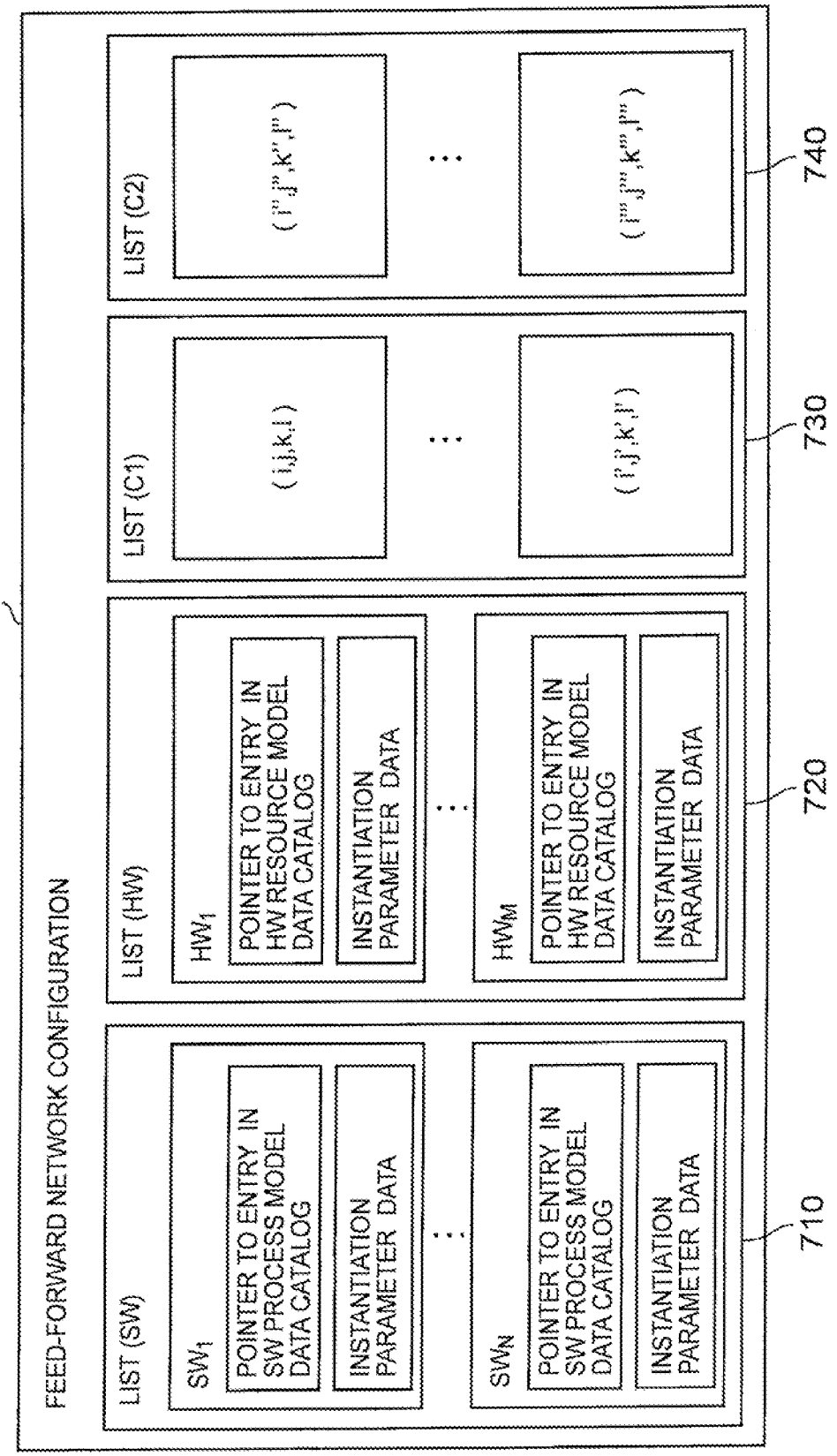
FIG. 11
It is a block diagram showing an example of the feed-forward network configuration F.

FIG. 11 shows an example of the feed-forward network configuration F.

In the example, the feed-forward network configuration F includes following items:
a list SW=(SW$_1$, ..., SW$_N$) 710 of calculation unit instantiation entries. An instantiation entry SW$_k$ includes the software process type of respective software process P$_k$ specified by a pointer to a list entry in the software process model data catalog, as well as instantiation parameter data.

a list HW=(HW$_1$, ..., HW$_N$) 720 of calculation unit instantiation entries. An instantiation entry HW$_n$ includes the hardware resource type of respective hardware resource R$_n$ specified by a pointer to a list entry in the hardware resource model data catalog, as well as instantiation parameter data.

a list C1 730 of interconnections, including tuples of the form (i, j, k, l), where i and j each point to an entry in the list SW, and k and l each denote a list of indices. Lists k and l have same length.

a list C2 740 of interconnections, including tuples of the form (i, j, k, l), where i points to an entry in the list SW, j points to an entry in the list HW, and k and l each denote a list of indices. Lists k and l have same length.

It should be noted that in the above, a software process type can for example refer to a specific version of a software component. Software process types can also be diversified based on further properties of the execution environment. For example, in the context of virtualized network packet processing software, it is useful to define a separate software process type for each different number of assigned virtual CPU cores, with the number of output vector components J$_i$ increasing with the number of virtual CPU cores. This is because software interrupt assignments may depend on the number of virtual CPU cores and load may be distributed asymmetrically among virtual CPU cores.

Further, it should be noted that the throughput estimation device 500 itself can be realized by software running on a general purpose computer hardware consisting of at least memory, CPU and I/O units.

Figure 12:
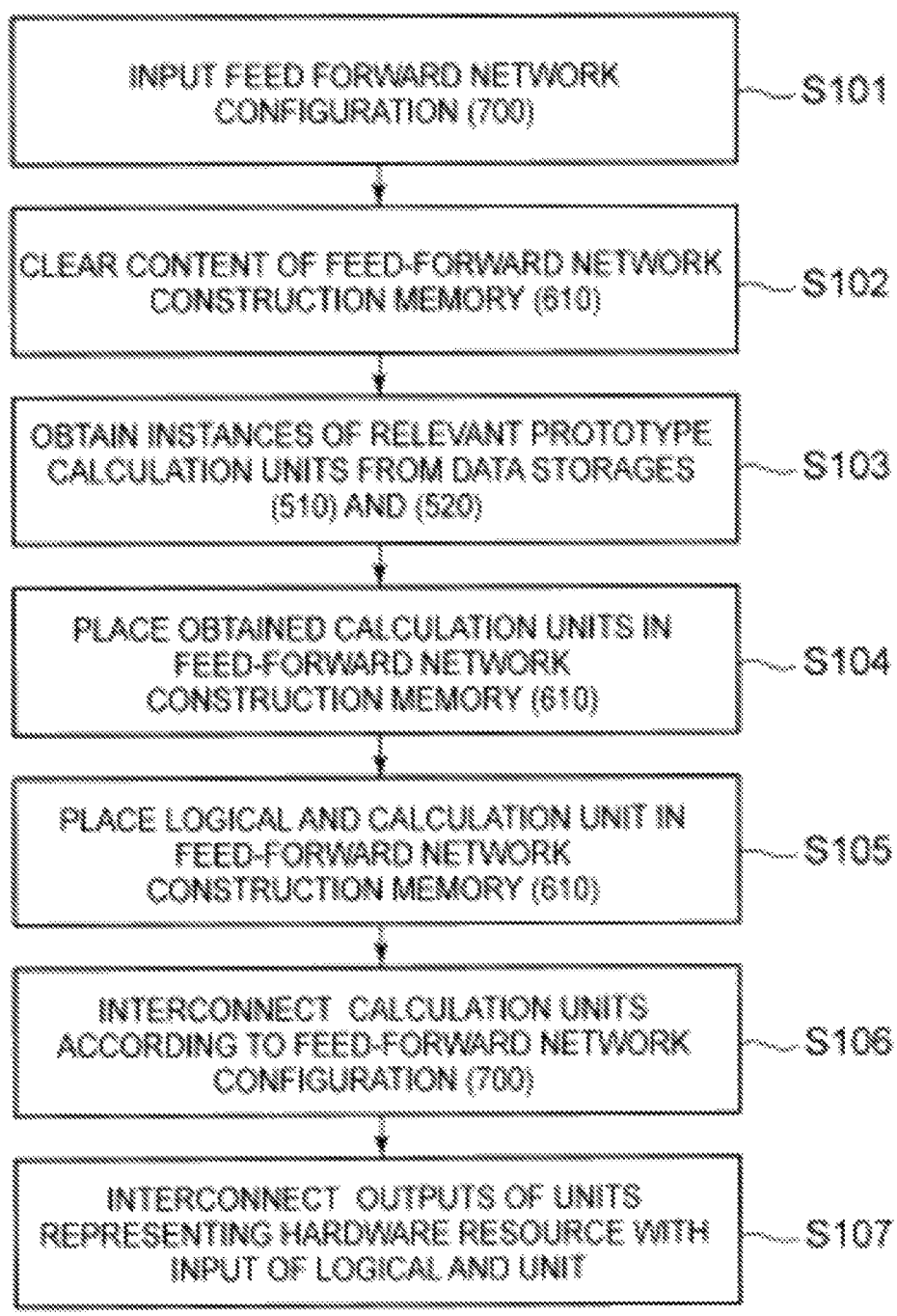
FIG. 12
It is a flowchart showing an example of an operation of the objective function evaluation unit and the optimization unit.

Next, an operation of the throughput estimation device 500 is explained. FIG. 12 is a flowchart showing an example of an operation of the feed-forward network building unit 530.

After inputting a feed-forward network configuration F, the feed-forward network building unit 530 clears the content of the feed-forward network construction memory 610 (steps S101 and 102).

Then, the feed-forward network building unit 530 generates calculation units by instantiating prototype calculation units from the data catalogs stored in the software process model data storage 510 and the hardware resource model data storage 520 for each entry specified in the lists SW and HW contained in the feed-forward network configuration F, fixing the instantiation parameters in evaluation formulas with the respective instantiation parameter data specified in the feed-forward network configuration F (step S103).

Then, the feed-forward network building unit 530 places these calculation units as well as a logical AND calculation unit 400 into the feed-forward network construction canvas in the feed-forward network construction memory 610 (steps S104 and S105). Then, the feed-forward network building unit 530 interconnects output vector components of calculation units with input components of calculation units (step S106), as follows:
(1) For each entry (i, j, k, l) in the list C1 contained in the feed-forward network configuration F, the feed-forward network building unit 530 connects for each a (a being in the range starting from one and ending with the length of k) the output vector component $J_{k[a]}^{(i)}$ to the input vector component $I_{l[a]}^{(j)}$.
(2) For each entry (i, j, k, l) in the list C2 contained in the feed-forward network configuration F, the feed-forward network building unit 530 connects for each a (a being in the range starting from one and ending with the length of k) the output vector component $J_{k[a]}^{(i)}$ to the input vector component $K_{l[a]}^{(j)}$.

Finally, the feed-forward network building unit 530 interconnects the outputs of calculation units representing a hardware resource with the input of the logical AND calculation unit 400 (step S107).

According to the above procedure, in the feed-forward network construction canvas, calculation units can be placed and interconnected as shown in FIG. 10.

Exemplary Embodiment 2

Figure 13:
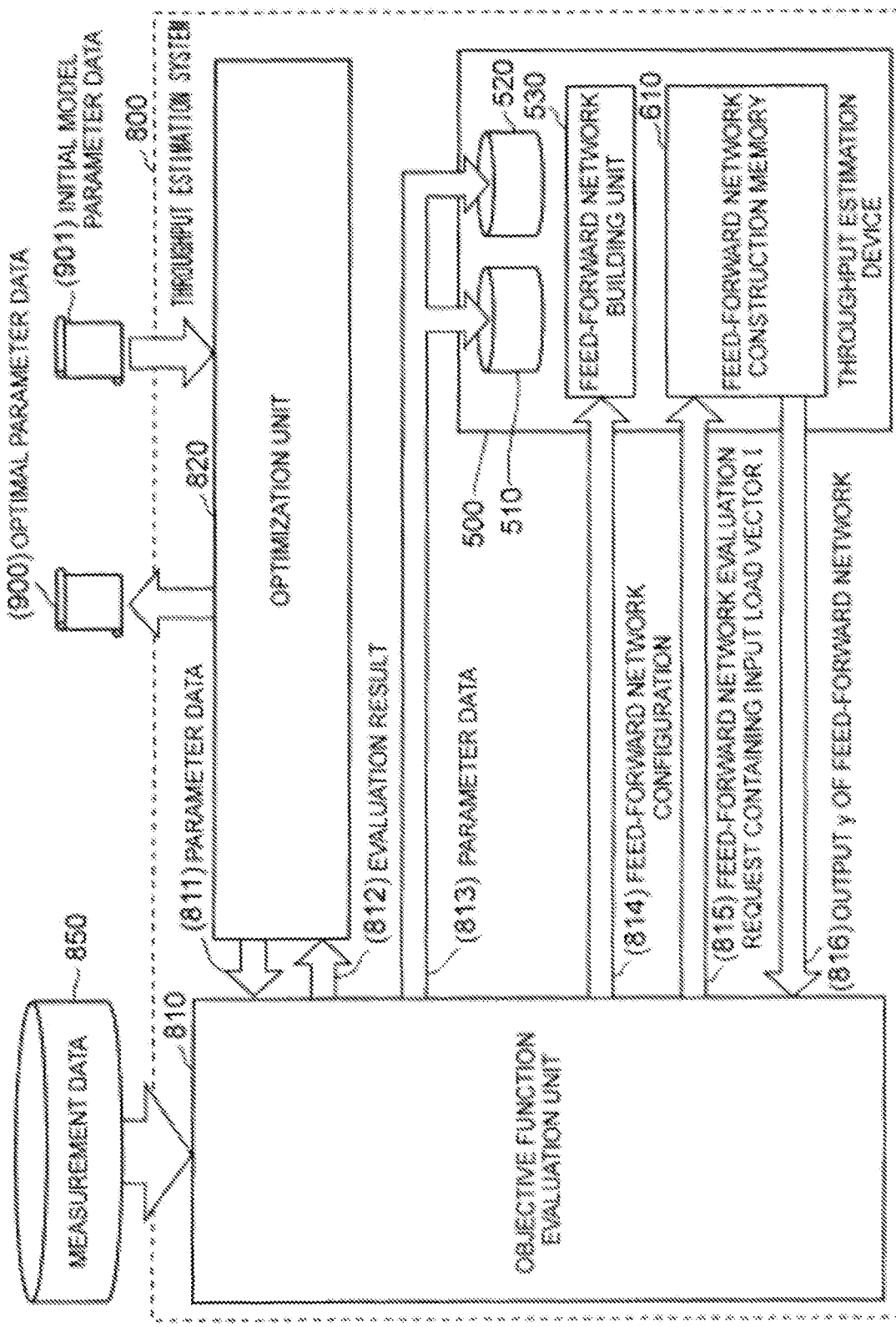
FIG. 13
It is a block diagram showing an exemplary embodiment of a throughput estimation system including the throughput estimation device.

FIG. 13 is a block diagram showing an exemplary embodiment of a throughput estimation system including the throughput estimation device.

The throughput estimation system determines appropriate model parameters to be stored in the software process model data storage 510 and the hardware resource model data storage 520 in the throughput estimation device 500 from throughput measurement data. Appropriate model parameters are determined by means of an optimization method which is used to minimize an objective function which may quantify the distance between estimation result and measurement result.

As shown in FIG. 13, the throughput estimation system 800 includes an objective function evaluation unit 810, an optimization unit 820 and the throughput estimation device 500 constructed in the first exemplary embodiment.

The objective function evaluation unit 810 evaluates an objective function o(p) and updates the model parameter data in the software process model data catalog and the hardware resource model data catalog stored in the throughput estimation device 500. The optimization unit 820 implements an optimization method so as to determine parameter data p that approximately minimizes an objective function o(p).

A measurement data storage 850 stores measurement data m. The measurement data m includes a list of tuples (F, I, y'), where F is a feed-forward network configuration F (feed-forward network configuration 700) as shown in FIG. 11, and I is a input load vector to the feed-forward network described by the feed-forward network configuration F. Further, y' is a value in the range of 0-1, indicating the fraction of measurements showing sufficient information processing quality, among a set of measurements of information processing quality on the configuration of software processes and hardware resources corresponding to the feed-forward network configuration F with input load I.

Figure 14:
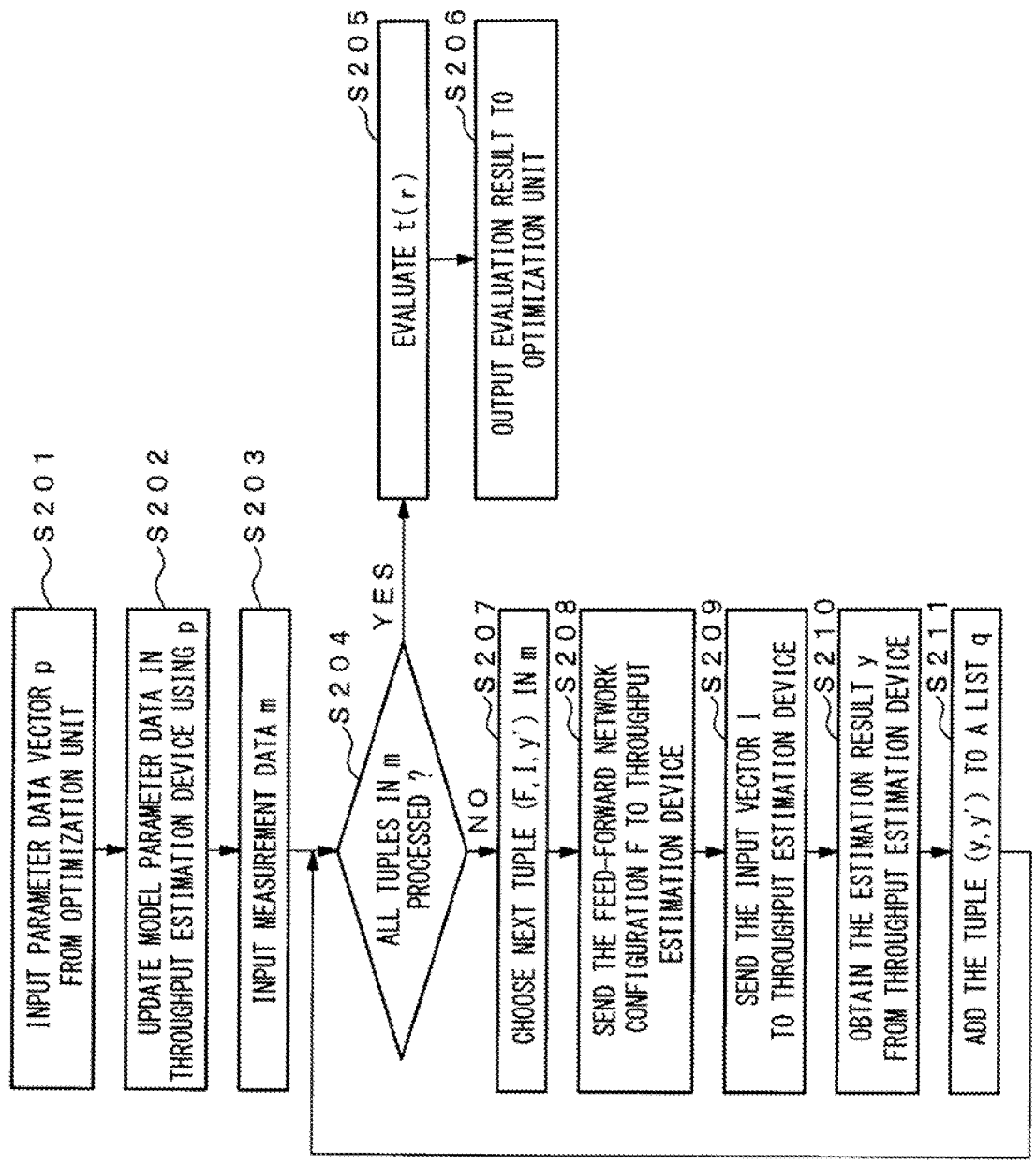
FIG. 14
It is a flowchart showing an example of an operation of the objective function evaluation unit and the optimization unit.

Next, an operation of the throughput estimation system 800 is explained. FIG. 14 is a flowchart showing an example of an operation of the objective function evaluation unit 810.

The objective function evaluation unit 810 inputs a parameter data p (parameter data 811) from the optimization unit 820 (step S201). The objective function evaluation unit 810 updates the model parameter data in the software process model data catalog and the hardware resource model data catalog in the throughput estimation device 500 using obtained parameter data p (parameter data 813) which is equivalent to a parameter data 811 (step S202). The objective function evaluation unit 810 inputs the measurement data m from the measurement data storage 850 (step S203). Then, for each tuple (F, I, y') contained in the measurement data m, the objective function evaluation unit 810 determines a value y as follows (steps S204 and S207):

(1) Send the feed-forward network configuration F to the throughput estimation device 500 (step S208). The throughput estimation device 500 will set up a feed-forward network in a feed-forward network modelling construction canvas.

(2) Send the input vector I to the throughput estimation device 500 (step S209). The throughput estimation device 500 will then evaluate the feed-forward network.

(3) Obtain the estimation result y from the throughput estimation device 500 (step S210).

(4) Append the tuple (y, y') to a list r (step S211).

Then, the objective function evaluation unit 810 evaluates a function t(r) (step S205), giving an evaluation result q=t(r) (step S208). Finally the objective function evaluation unit 810 outputs the value of q to the optimization unit 820 (step S206). The value q determined in step S208 defines the value o(p) for the parameter data p input in step S201, that is, o(p)=q.

The optimization unit 820 implements an optimization method so as to determine parameter data p that approximately minimizes an objective function o(p). The operation of the optimization unit 820 is as follows.

First, the optimization unit 820 inputs initial model parameter data 901. Using the initial parameter data 901 and a general optimization method, the optimization unit 820 determines an approximately optimal value for p. To find such an optimal value, the general optimization method will repeatedly evaluate the objective function o(p) for different p. To evaluate the objective function o(p), the optimization unit 820 obtains the evaluation result 812 after the optimization unit 820 sends the parameter data 811 to the objective function evaluation unit 810.

In the above processes, initially, before using the throughput estimation device 500, it is assumed that the model data catalogs in the software process model data storage 510 and the hardware resource model data storage 520 of the throughput estimation device 500 already contain evaluation formula data for each software process type/hardware resource type. The model parameter data in the software process model data storage 510 and the hardware resource model data storage 520 can take arbitrary initial values.

It should be noted that the objective function evaluation unit 810 sequentially outputs configurations of software processes, hardware resources, and their interconnection to the throughput estimation device 500 by performing the process of step S208. The objective function evaluation unit 810 sequentially outputs load vectors describing input information load to software processes to the throughput estimation device 500 by performing the process of step S209. The objective function evaluation unit 810 sequentially inputs a result value from the throughput estimation device 500 by performing the process of step S210.

The function t(r) evaluated by the objective function evaluation unit 810 can be chosen, for example, as:

$$t(r) = S_{(y,y') \text{included in } r}(y'-y)^2 \qquad \text{equation (1)}$$

Here, $[S_{(y,y') \text{included in } r}]$ means the sum total for (y, y') included in r.

The optimization method to use in the optimization unit 820 can be chosen, for example, to be a method based on gradient descent, where the gradient of o(p) is calculated by a numerical approximation. To use optimization methods like gradient descent effectively, it is required to assume sufficient smoothness of o(p), which can be ensured by both restricting to smooth calculation units such as those given in FIGS. 3 and 6, and by using smooth functions t(r) such as the equation (1).

Incidentally, with the approach of separating model data for software processes and hardware resources, the number of parameter data to be determined relates roughly to the sum of software process types and hardware resource types, hence the number of performance evaluating measurements needed to obtain data to store in the measurement data storage 850 also relates roughly to the sum of software process types and hardware resource types.

Although, the foregoing exemplary embodiment s can be suitably applied to estimate VNF performance in the context of NFV, the target of the foregoing exemplary embodiment is not limited VNF.

Figure 15:
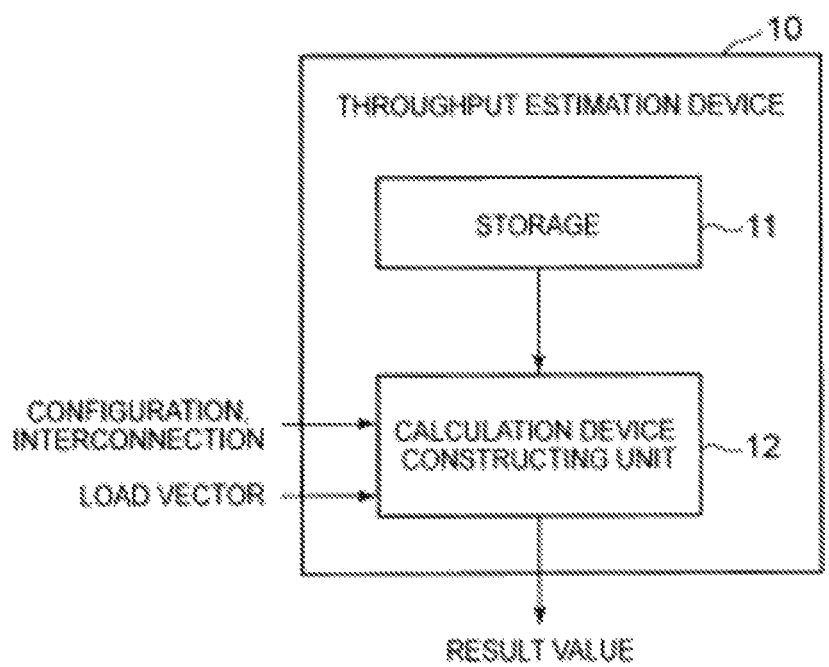
FIG. 15
It is a block diagram showing main parts of a throughput estimation device.

FIG. 15 is a block diagram showing main parts of a throughput estimation device according to the present invention. As shown in FIG. 15, the throughput estimation device 10 includes a storage 11 (realized by the software process model data storage 510 and the hardware resource model data storage 520 in the exemplary embodiments) which stores tuples, each including an evaluation formula and parameter data, and a calculation device constructing unit 12 (realized by the feed-forward network building unit 530 in the exemplary embodiments) which constructs a calculation device (realized by the calculation device including the calculation units 201-204, 321-327 in the throughput estimation device 10 in the exemplary embodiments) according to a configuration including data associated with software processes, data associated with hardware resources, data associated with interconnections between a software process and a hardware resource, and the tuples, wherein the calculation device inputs a load vector describing input information load to the software processes, and outputs a result value.

Figure 16:
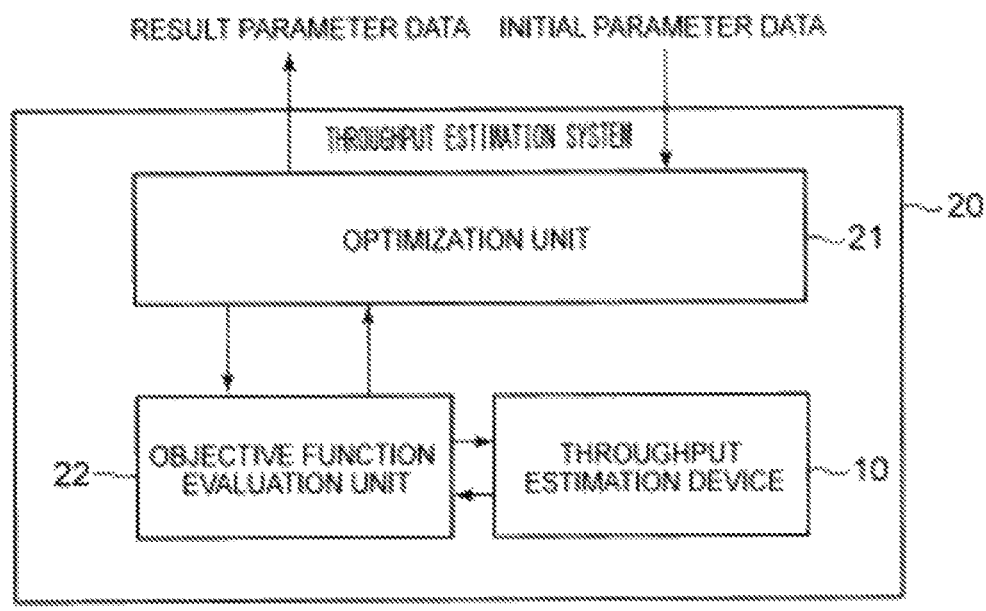
FIG. 16
It is a block diagram showing main parts of a throughput estimation system.

FIG. 16 is a block diagram showing main parts of a throughput estimation system. As shown in FIG. 16, the throughput estimation system 20 includes the throughput estimation device 10, an optimization unit 21 (realized by the optimization unit 820 in the exemplary embodiments) which minimizes an objective function; and objective function evaluation unit 22 (realized by the objective function evaluation unit 810 in the exemplary embodiments) which inputs parameter data and measurement data, updates the parameter data stored in the throughput estimation device 10 according to the inputted parameter data, sequentially outputs the configurations to the throughput estimation device 10, sequentially outputs the load vectors to the throughput estimation device 10, sequentially inputs the result value from the throughput estimation device 10, and outputs an evaluation result to the optimization unit 21.

Figure 17:
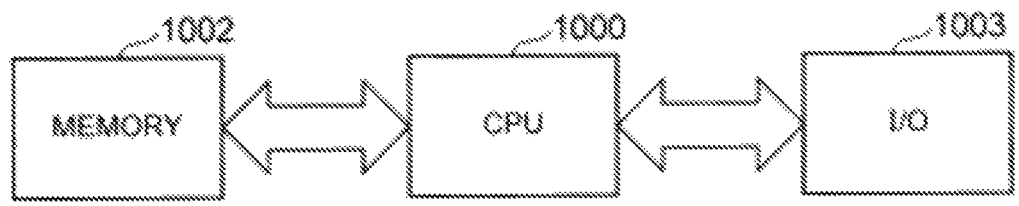
FIG. 17
It is a block diagram showing a configuration example of an information processing system capable of implementing the functions of a throughput estimation device or a throughput estimation system.

It should be noted that the throughput estimation device 10,500 shown in FIG. 10 or FIG. 15 can be realized by the information processing system including a CPU 1000, a memory 1002 and I/O device 1003 shown in FIG. 17. Thus, the feed-forward network building unit 530 in FIG. 10 and the calculation device constructing unit 12 in FIG. 15 can be realized by the CPU 1000 performing processes according to the program stored in the memory 1002 (non-transitory computer-readable memory). The software process model data storage 510 and the hardware resource model data storage 520 in FIG. 10 and the storage 11 in FIG. 15 can be realized by the memory 1002.

The throughput estimation system shown in FIG. 13 or FIG. 16 also can be realized by the information processing system. Thus, the objective function evaluation unit 810 and the optimization unit 820 in FIG. 13, and the objective function evaluation unit 22 and the optimization unit 21 in FIG. 16 can be realized by the CPU 1000 performing processes according to the program stored in the memory 1002.

The foregoing exemplary embodiments may be partly or wholly described in the following supplementary notes, though the structure of the present invention is not limited to such.

(Supplementary note 1) A throughput estimation device comprising:

storing means for storing tuples, each including an evaluation formula and parameter data; and calculation device constructing means for constructing a calculation device according to a configuration including data associated with software processes, data associated with hardware resources, data associated with interconnections between a software process and a hardware resource, and the tuples, wherein the calculation device inputs a load vector describing input information load to the software processes, and outputs a result value.

(Supplementary note 2) The throughput estimation device according to supplementary note 1, wherein the calculation device includes:

a plurality of calculation units, each corresponding to one of the software processes executed on a general purpose computer, wherein each calculation unit inputs the load vector describing input information load corresponding to software process;

a plurality of calculation units, each corresponding to one of the hardware resources of the general purpose computer; and outputting means for outputting the result value generated by gathering outputs of all calculation units corresponding to the hardware resources.

(Supplementary note 3) A throughput estimation system including the throughput estimation device of supplementary note 1 or 2, the throughput estimation system further including:

optimization means for minimizing an objective function; and objective function evaluation means for inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result to the optimization means.

(Supplementary note 4) The throughput estimation system according to supplementary note 3, wherein the objective function evaluation means updates the parameter data stored in the throughput estimation device using parameter data optimized by the optimization means.

(Supplementary note 5) A throughput estimation method comprising:

constructing a throughput estimation device including a calculation device according to a configuration including data associated with software processes, data associated with hardware resources, data associated with interconnections between a software process and a hardware resource, and the tuples, each including an evaluation formula and parameter data, wherein the calculation device is so constructed that it outputs a result value responsive to inputted a load vector describing input information load to the software processes.

(Supplementary note 6) The throughput estimation method according to supplementary note 5, wherein the calculation device is so constructed that it includes;

a plurality of calculation units, each corresponding to one of the software processes executed on a general purpose computer, wherein each calculation unit inputs the load vector describing input information load corresponding to software process;

a plurality of calculation units, each corresponding to one of the hardware resources of the general purpose computer; and outputting means for outputting the result value generated by gathering outputs of all calculation units corresponding to the hardware resources.

(Supplementary note 7) The throughput estimation method according to supplementary note 5 or 6, minimizing an objective function; and inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result.

(Supplementary note 8) The throughput estimation method according to supplementary note 7, wherein the parameter data stored in the throughput estimation device is updated using parameter data optimized.

(Supplementary note 9) A throughput estimation program, for causing a computer to execute:

a process of constructing a throughput estimation device including a calculation device according to a configuration including data associated with software processes, data associated with hardware resources, data associated with interconnections between a software process and a hardware resource, and the tuples, each including an evaluation formula and parameter data, wherein the calculation device is so constructed that it outputs a result value responsive to inputted a load vector describing input information load to the software processes.

(Supplementary note 10) The throughput estimation program according to supplementary note 9, wherein the calculation device is so constructed that it includes;

a plurality of calculation units, each corresponding to one of the software processes executed on a general purpose computer, wherein each calculation unit inputs the load vector describing input information load corresponding to software process;

a plurality of calculation units, each corresponding to one of the hardware resources of the general purpose computer, wherein each calculation unit is interconnected to at least one software process; and outputting means for outputting the result value generated by gathering outputs of all calculation units corresponding to the hardware resources.

(Supplementary note 11) The throughput estimation program according to supplementary note 9 or 10, for causing a computer to further execute:

a process of minimizing an objective function; and a process of inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result.

(Supplementary note 12) The throughput estimation program according to supplementary note 11, wherein the parameter data stored in the throughput estimation device is updated using parameter data optimized.

(Supplementary note 13) A non-transitory computer-readable information recording media storing throughput estimation program, which executed by a processor, to perform:

a process of constructing a throughput estimation device including a calculation device according to a configuration including data associated with software processes, data associated with hardware resources, data associated with interconnections between a software process and a hardware resource, and the tuples, each including an evaluation formula and parameter data, wherein the calculation device is so constructed that it outputs a result value responsive to inputted a load vector describing input information load to the software processes.

(Supplementary note 14) A throughput estimation program, which executed by a processor, to perform a method of supplementary note 5, 6, 7 or 8.

While the present invention has been described with reference to the exemplary embodiments and examples, the present invention is not limited to these exemplary embodiments and examples. Various changes understandable by those skilled in the art can be made to the structures and details of the present invention within the scope of the present invention.

REFERENCE SIGNS LIST 10 throughput estimation device
11 storage
12 calculation device constructing unit
20 throughput estimation system
21 optimization unit
22 objective function evaluation unit
100 feed-forward network
200 software process
210 calculation unit representing a software process
300 general purpose computer
310 calculation unit representing a hardware process
400 logical AND calculation unit
500 throughput estimation device
510 software process model data storage
520 hardware resource model data storage
530 feed-forward network building unit
610 feed-forward network construction memory
700 feed-forward network configuration
800 throughput estimation system
810 objective function evaluation unit
820 optimization unit
1000 CPU
1002 memory
1003 I/O device

What is claimed is:

1. A throughput estimation device generating and evaluating a feed-forward network that includes calculation units representing software processes and calculation units representing hardware resources, comprising:

a software process model data storage which stores a plurality of software tuples, each including parameter data representing a model of a software process and a first evaluation formula for calculating an output vector of a calculation unit representing the software process;

a hardware resource model data storage which stores a plurality of hardware tuples, each including parameter data representing a model of a hardware resource and a second evaluation formula for calculating an output of the calculation unit representing the hardware resource;

one or more memories storing instructions; and one or more processors configured to execute the instructions to:
  construct the calculation unit representing the software process in a construction memory using a software tuple,
  construct the calculation unit representing the hardware resource next to the constructed calculation unit representing the software process in the construction memory using the hardware tuple, and
  connect an output of the calculation unit to an input of another calculation unit according to a software list in which data indicating connection with other software processes is set and a hardware list in which data indicating connection with at least the software process,
wherein the calculation unit representing the software process inputs a load vector describing input information load to the software process and transforms, according to the first evaluation formula, the load vector to a vector input to the another calculation unit, and
wherein the calculation unit representing the hardware process generates a probability value, according to the second evaluation formula, indicating a probability that a load corresponding to the transformed vector can be handled by the hardware resource without exceeding its capacity.

2. The throughput estimation device according to claim 1, wherein
the calculation unit representing the software process corresponds to one of the software processes executed on a computer, wherein the calculation unit representing the software process inputs the load vector, and
wherein the one or more processors are further configured to execute the instructions to output the result value generated by gathering outputs of all calculation units corresponding to the hardware resources.

3. A computer-implemented throughput estimation method of generating and evaluating a feed-forward network that includes calculation units representing software processes and calculation units representing hardware resources in a throughput estimation device,
wherein the throughput estimation device includes:
  a software process model data storage which stores a plurality of software tuples, each including parameter data representing a model of a software process and a first evaluation formula for calculating an output vector of a calculation unit representing the software process, and
  a hardware resource model data storage which stores a plurality of hardware tuples, each including parameter data representing a model of a hardware resource and a second evaluation formula for calculating an output of the calculation unit representing the hardware resource, and
wherein the throughput estimation method comprises:
constructing the calculation unit representing the software process in a construction memory using a software tuple,
constructing the calculation unit representing the hardware resource next to the constructed calculation unit representing the software process in the construction memory using a hardware tuple, and
connecting an output of the calculation unit to an input of another calculation unit according to a software list in which data indicating connection with other software processes is set and a hardware list in which data indicating connection with at least the software process,
wherein a load vector describing input information load to the software process is input to the calculation unit representing the software process and according to the first evaluation formula, the load vector is transformed to a vector input to the another calculation unit by the calculation unit representing the software process, and
wherein a probability value indicating a probability that a load corresponding to the transformed vector can be handled by the hardware resource without exceeding its capacity is generated by the calculation unit representing the hardware process, according to the second evaluation formula.

4. The computer-implemented throughput estimation method according to claim 3,
wherein
the calculation unit representing the software process corresponds to one of the software processes executed on a computer, wherein the calculation unit representing the software process inputs the load vector, and
wherein the throughput estimation method outputs the result value generated by gathering outputs of all calculation units corresponding to the hardware resources.

5. The computer-implemented throughput estimation method according to claim 4, further comprising:
minimizing an objective function; and
inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result.

6. The computer-implemented throughput estimation method according to claim 3, further comprising:
minimizing an objective function; and
inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result.

7. The computer-implemented throughput estimation method according to claim 6,
wherein the parameter data stored in the throughput estimation device is updated using parameter data optimized.

8. A non-transitory computer readable information recording medium storing a throughput estimation program, when executed by a processor, implemented in a throughput estimation device,
wherein the throughput estimation device includes:
  a software process model data storage which stores a plurality of software tuples, each including parameter data representing a model of a software process and a first evaluation formula for calculating an output vector of a calculation unit representing the software process, and a hardware resource model data storage which stores a plurality of hardware tuples, each including parameter data representing a model of a hardware resource and a second evaluation formula for calculating an output of the calculation unit representing the hardware resource, and wherein the throughput estimation program performs:
constructing the calculation unit representing the software process in a construction memory using the software tuple,
constructing the calculation unit representing the hardware resource next to the constructed calculation unit representing the software process in the construction memory using the hardware tuple, and
connecting an output of the calculation unit to an input of another calculation unit according to a software list in which data indicating connection with other software processes is set and a hardware list in which data indicating connection with at least the software process, wherein a load vector describing input information load to the software process is input to the calculation unit representing the software process and according to the first evaluation formula, the load vector is transformed to a vector input to the another calculation unit by the calculation unit representing the software process, and wherein a probability value indicating a probability that a load corresponding to the transformed vector can be handled by the hardware resource without exceeding its capacity is generated by the calculation unit representing the hardware process, according to the second evaluation formula.

9. The non-transitory computer readable recording medium according to claim 8, wherein the throughput estimation program further performs:
minimizing an objective function; and
inputting parameter data and measurement data, updating the parameter data stored in the throughput estimation device according to the inputted parameter data, sequentially outputting the configurations to the throughput estimation device, sequentially outputting the load vectors to the throughput estimation device, sequentially inputting the result value from the throughput estimation device, and outputting an evaluation result.

* * * * *